United States Patent
Veugen

(10) Patent No.: US 11,595,185 B2
(45) Date of Patent: Feb. 28, 2023

(54) DISTRIBUTED COMPUTATION METHOD AND SYSTEM

(71) Applicant: Nederlandse Organisatie voor toegepast-natuurwetenschappelijk onderzoek TNO, 's-Gravenhage (NL)

(72) Inventor: Peter Joannes Mathias Veugen, Voorburg (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 173 days.

(21) Appl. No.: 16/956,848

(22) PCT Filed: Dec. 21, 2018

(86) PCT No.: PCT/NL2018/050884
§ 371 (c)(1),
(2) Date: Jun. 22, 2020

(87) PCT Pub. No.: WO2019/125173
PCT Pub. Date: Jun. 27, 2019

(65) Prior Publication Data
US 2020/0322125 A1    Oct. 8, 2020

(30) Foreign Application Priority Data
Dec. 22, 2017    (EP) ................................ 17210495

(51) Int. Cl.
*H04L 9/00* (2022.01)
*H04L 9/08* (2006.01)

(52) U.S. Cl.
CPC ............ *H04L 9/008* (2013.01); *H04L 9/0861* (2013.01); *H04L 2209/46* (2013.01)

(58) Field of Classification Search
CPC ... H04L 9/008; H04L 9/0861; H04L 2209/46; H04L 2209/50
See application file for complete search history.

(56) References Cited

U.S. PATENT DOCUMENTS

| | | | |
|---|---|---|---|
| 9,571,268 B2 * | 2/2017 | Kipnis | ..................... H04L 9/08 |
| 2017/0155510 A1 * | 6/2017 | Cloostermans | ....... H04L 9/0891 |

FOREIGN PATENT DOCUMENTS

| | | | | |
|---|---|---|---|---|
| EP | 1683298 B1 | 9/2008 | | |
| EP | 1815637 B1 | 4/2016 | | |
| WO | WO-2017130200 A1 * | 8/2017 | ............. | G06F 21/44 |

OTHER PUBLICATIONS

Payman Mohassel, "Fast Computation on Encrypted Polynomials and Applications", International Conference on Financial Cryptography and Data Security; Lecture Notes in Computer Science; Lect. Notes Computer, vol. 7092, Chap. 17, pp. 234-254.

(Continued)

*Primary Examiner* — Kristine L Kincaid
*Assistant Examiner* — Lydia L Noel
(74) *Attorney, Agent, or Firm* — Banner & Witcoff, Ltd.

(57) ABSTRACT

Computation efficiency of distributed secure implementation of the computation of a (sum of) products of values Vi, Wi from different servers on a distributed computing system is improved by generation of coefficients of a first and second polynomials P, Q by a first server. The first polynomial P has all numbers Xi from a first data set on the first server as roots. The second polynomial Q has values $Q(X_i)=V_i$ for the numbers Xi from the first data set. The first server transmits coefficients of the polynomials to a second server in encrypted form. The second sever computes encrypted values $<P(X_i')>$ and $<Q(X_i')>$ of the polynomials for a number Xi' in a second set from the encrypted coefficients. The second server computes an encrypted (Continued)

binary value <di> from the encrypted value <p(Xi')> of the first polynomial p and computes an encrypted value of a product <di Q(Xi') Wi>.

14 Claims, 2 Drawing Sheets

(56) References Cited

OTHER PUBLICATIONS

Helger Lipmaa and Tomas Toft, "Secure Equality and Greater-Than Tests with Sublinear Online Complexity", Automata, Languages, and Programming, vol. 7966, pp. 645-656.
Carmit Hazay, "Oblivious Polynomial Evaluation and Secure Set-Intersection from Algebraic PRFs", Journal of Cryptology, 2018, vol. 31, No. 2, pp. 537-586.
Rafael Tonicelli et al., "Information-theoretically secure oblivious polynomial evaluation in the commodity-based model", International Journal of Information Security (IJIS), vol. 14, No. 1, pp. 73-84.
Apr. 17, 2019, International Search Report and Written Opinion, PCT/NL2018/050884.
Ivan Damgard et al., "Unconditionally secure constant-rounds multi-party computation for equality, comparison, bits and exponentiation," TCC 2006, pp. 285-304, 2006.
Carmit Hazay, Muthuramakrishnan Venkitasubramanniam, "Scalable multi-party private set-intersection," Cryptology ePrint Archive, Report 2017/027, 2017.
Michael J. Freedman et al., "Efficient Private Matching and Set Intersection," FNP04, 2004.
Yuan Tian and Hao Zhang, "GUC-Secure Set-Intersection Computation," Prov-Sec 2009, LNCS 5848, pp. 245-259, 2009.
Changyu Dong et al., "When Private Set Intersection Meets Big Data: An Efficient and Scalable Protocol," CCS 2013.
Benny Pinkas et al., "Scalable Private Set Intersection Based on OT Extension," USENIX Security 2015.
Wladimir Kolesnikov et al., "Practical Multi-party Private Set Intersection from Symmetric-Key Techniques," ACM CCS 2017.
Hao Chen et al., "Fast Private Set Intersection from Homomorphic Encryption," Cryptology ePrint Archive: Report 2017/299, 2017.

* cited by examiner

US 11,595,185 B2

DISTRIBUTED COMPUTATION METHOD AND SYSTEM

CROSS-REFERENCE TO RELATED APPLICATIONS

This application is a U.S. National Stage application under 35 U.S.C. § 371 of International Application PCT/NL2018/050884 (published as WO 2019/125173 A1), filed Dec. 21, 2018, which claims the benefit of priority to Application EP 17210495.2, filed Dec. 22, 2017. Benefit of the filing date of these prior applications is hereby claimed. Each of these prior applications is hereby incorporated by reference in its entirety.

FIELD OF THE INVENTION

The invention relates to a distributed computation method and system.

BACKGROUND

FIG. 1 shows a basic example of a prior art distributed computation system, comprising a first and second data processor 10a, b coupled by a communication network 12 between the data processors 10a, b (preferably a communication network such as the Internet). The first and second data processor 10a, b may be part of distinct servers that communicate via the communication network 12. Each data processor 10a, b is coupled to an associated storage unit 14a,b, which stores a database. Storage unit 14a,b may be part of the servers. During a distributed computation, data processors 10a, b perform operations, each using data from its associated database, and exchange data via the communication network 12. More generally a distributed computation system comprises a plurality of separate computation units and communication channels between the separate computation units. Communication network 12 is an example of a communication channel between the devices, over which data used in the distributed computation is transmitted. Communication network 12 may be a wired network, a wireless (radio) network etc.

One advantage of a distributed computation systems is that it can be used to limit access to the databases in storage units 14a, b from the network 12. When a computation is requested that combines data from databases in the different storage units 14a, b, first and second data processor 10a, b are able to compute intermediate results using data from their associated databases locally and to encrypt data from the database, or such intermediate results before transmission via communication network 12. This makes it possible to perform "secure" computations, i.e. computations, such as a form of addition, multiplication or comparison of operands, wherein no device that performs (part of) the computation needs to access unencrypted values of the operands. When a homomorphic encryption scheme is used, first and second data processor 10a, b can perform computations with data from each other without needing the ability to decrypt the data, thus avoiding a need to make data from any database accessible in plain form outside the database and its associated data processor 10a,b.

However, this kind of computation comes at the expense of a heavy demand on communication bandwidth over communication network 12. For example, each time when it has to be determined whether data from a record in a database from first storage unit 14a equals data from a record in the database in second storage unit 14b, first and second processor 10a,b need to execute a secure equality protocol (e.g. a secure comparison protocol) that involves communication via communication network 12. When the databases have N and M records respectively, the communication needed in such a secure equality protocol is needed N×M times.

Fortunately, the amount of communication can be reduced by using the prior art "oblivious polynomial evaluation". This protocol is based on a polynomial function P(x) of the data values, that has a set of roots that consists of all N data values from first storage unit 14a that need to be compared. In the "oblivious polynomial evaluation", first processor 10a computes the coefficients of this polynomial, encrypts these coefficients and transmits the encrypted coefficients to second processor 10b. For this, transmission of N coefficients over communication network 12 is needed.

Subsequently, second processor 10b evaluates the polynomial for the each of the M values from second storage unit 14b that need to be compared, resulting in M evaluation results. When the coefficients have been encrypted uses an additive homomorphic encryption, this can be done within second processor 10b without decryption and without further communication over communication network 12. The evaluation results are zero for those of the M values that are equal to data values in the N data values from the first storage unit 14a, and non-zero otherwise.

Next the first and second processor 10b jointly execute the secure equality protocol (i.e. a secure multiparty equality protocol) for each of the M evaluation results, to obtain (encrypted) information that represents which of the evaluation results equal zero, without disclosing this to first or second processor 10b. The values for which the evaluation results equal zero are present in both databases. As may be noted this, the amount of bandwidth use over communication network 12 in his process is proportional to N and M, but not to their product N×M, which is a considerable reduction compared to direct comparison of the N and M data values.

However, the bandwidth use may increase once more when use is made of the information that represents which of the evaluation results equal zero. For example a computation of a correlation may require computation combinations of values derive from the different storage units 14a,b, such as a sum of products v*w of values v and w in first fields "v" and "w" of selected records (v,x) and (w,y) in the database in first and second storage unit 14a respectively, where the records are selected with the condition that the values in a second field x, y of the databases are equal (e.g. equal identifier values). The computation of a product v*w requires additional communication. After the "oblivious polynomial evaluation", the second processor 10b will have encrypted information indicating which records (w,y) are selected, but not which records (v,x) are selected. To obtain the values v, substantially more communication would be needed between first and second processor 10a,b. The same goes for computations of values other functions f(v,w) of the values of v, w, instead of their product v*w, e.g. when a sum of such function values f(v,w) has to be computed.

SUMMARY

It is an object to reduce bandwidth use in a distributed computing system, and in particular to provide a secure implementation in the distributed computing system of a computation of an encrypted product v*w of or other function of values v, w from different devices that are associated with a same value x in both devices, wherein the implementation reduces band with use.

For embodiments, it is a further object to provide for the computation of a sum of such products for a plurality of values from different devices in the distributed computing system.

A method according to claim 1 is provided. Herein an asymmetric operation is used, wherein the different devices that have access to the different factors in the products, or the arguments of the function, perform different roles. The devices may be separate servers that communicate with each other over a communication network such as the Internet. The device that has access to the first factors Vi encodes the first factors Vi and the numbers Xi with which these factors are associated in two polynomials, and transmits encrypted versions of the coefficients of these polynomials. The second device uses the encrypted coefficients to compute encrypted values of these polynomials, which are then used in secure computations that may be executed jointly with the first device. The two polynomials include a first polynomial of the type known from the secure intersection protocol, which as the values of all Xi from the first device as roots. In contrast, the second polynomial takes the values of the first factors as values for the numbers Xi. With such a computation. In an embodiment at least the encrypted product <di Q(Xi') Wi> is computed (as used herein the symbols < and > will denote an encrypted version of the value of the term between these symbols).

A system and devices are provided that are configured to execute the method, or parts of the method performed by the respective devices. The devices may comprise computer programs that configure them to perform their respective parts of the method. The instructions of the computer programs may be stored for example in semi-conductor memories of the devices or on disks or other storage media in the devices.

In an embodiment an encrypted the encrypted product or function value are computed for all of the numbers Xi' and associated values Wi from the second set and an encrypted sum of the products or function values is computed from this. Alternatively, the encrypted product or function value(s) alone may be computed and stored for later use that is not part of the claimed method, without computing the encrypted sum as part of the method.

In an embodiment selection filters are provided to the first and/or second device. This enables one or both of the devices to select the first anchor second set from a larger set in the first and/or second device based on the selection filters prior to performing the computations, thereby reducing the need for communication.

In an embodiment, the methods is used compute results from a combination of databases without revealing the content of the databases. To do so, to the first device retrieves the numbers Xi and associated values Vi from a first data base wherein the numbers Xi and associated first values Vi are stored in association with each other, such as in data base records of each number Xi containing the associated value Vi. The first device computes the encrypted coefficients of the first and second polynomial P from the retrieved numbers Xi and first values Vi.

The second device may retrieve the numbers Xi' and associated second values Wi from a second data base wherein the numbers Xi' and associated values Wi are stored in association with each other, such as in data base records of each number Xi' containing the associated value Wi, the second device using the retrieved numbers Xi in said computing of encrypted values <P(Xi')> and <Q(Xi')> of the first and second polynomial P, Q, the second device using the retrieved second values in the computation of the encrypted value of the sum of products <di Q(Xi') Wi>.

In an embodiment, the second device executes the secure multiparty equality protocol and the secure multiparty multiplication protocol jointly with the first device using communication via the communication network. In other embodiments, a third device may be used to perform the multiparty equality protocol and/or the secure multiparty multiplication protocol alone, jointly with the second device of jointly with the first device and the second device. In an embodiment the third device may be a privacy service provider.

In an embodiment, the second device computes an encrypted product <Q(Xi') Wi> of the encrypted value <Q(Xi')> of the second polynomial. Q computed for the number Xi', the second device using the secure multiparty multiplication protocol to compute product of the encrypted binary value <di> and the encrypted product <Q(Xi') Wi>. In an embodiment a computed sum of product is used to compute a correlation between sensor data Vi, Wi sampled at coinciding spatial or temporal locations Xi, Xi' by sensors that make the sensor data accessible to the first and second device respectively. Alternatively, <di Wi> or <di Q(xi')> may be computed first and <di Q(xi') wi> may be compute using one of these. But computing <Q(Xi') Wi> first may reduce the amount of communication traffic.

BRIEF DESCRIPTION OF THE DRAWING

These and other objects and advantageous aspects will become apparent from a description of exemplary embodiments with reference to the following figures.

DETAILED DESCRIPTION OF EXEMPLARY EMBODIMENTS

Figure 1:
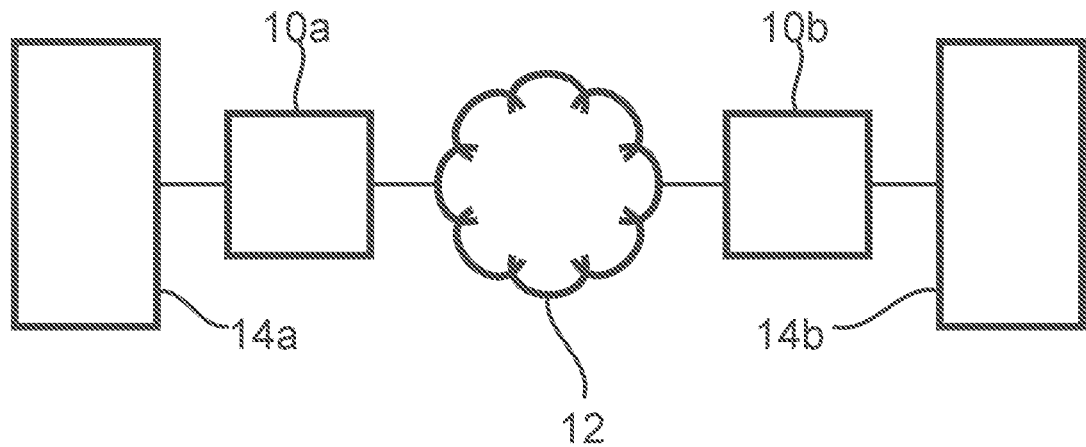
FIG. 1 shows a prior art distributed computation system
Figure 3:
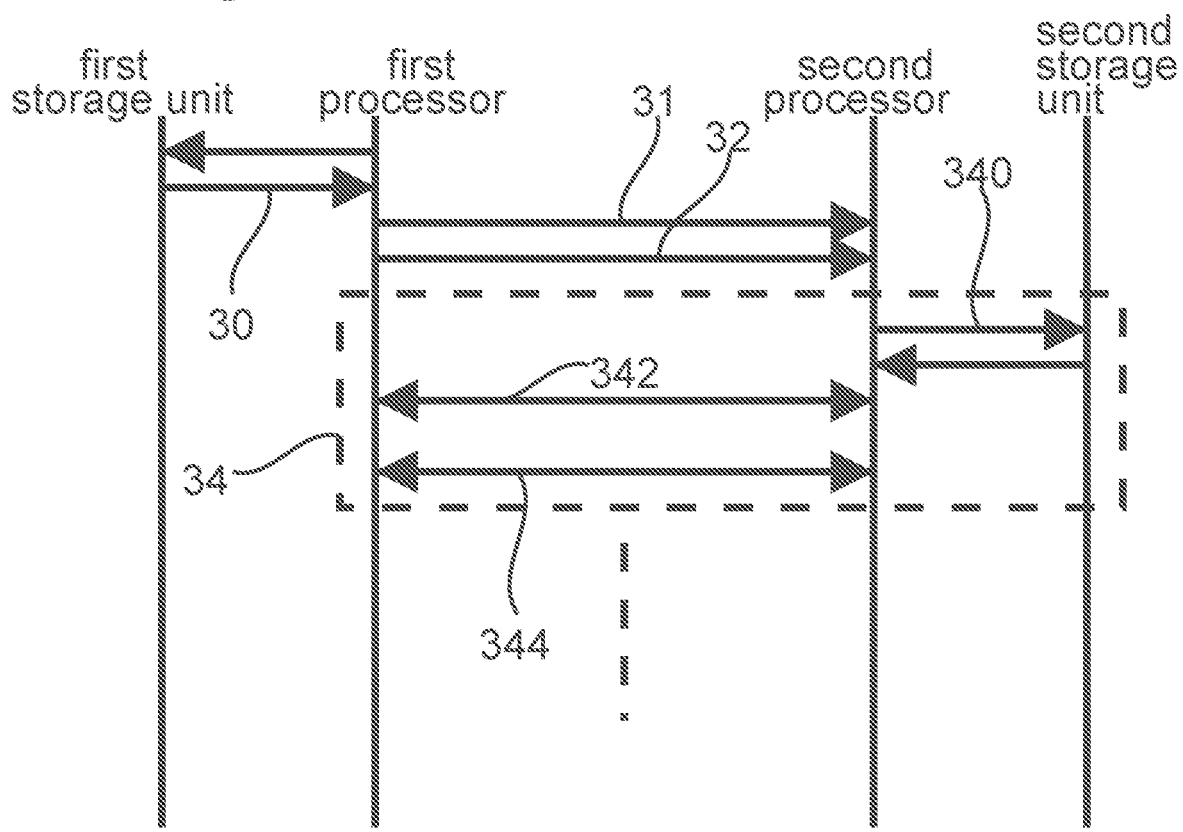
FIG. 3 shows communication in a distributed computation system.
Figure 2A:
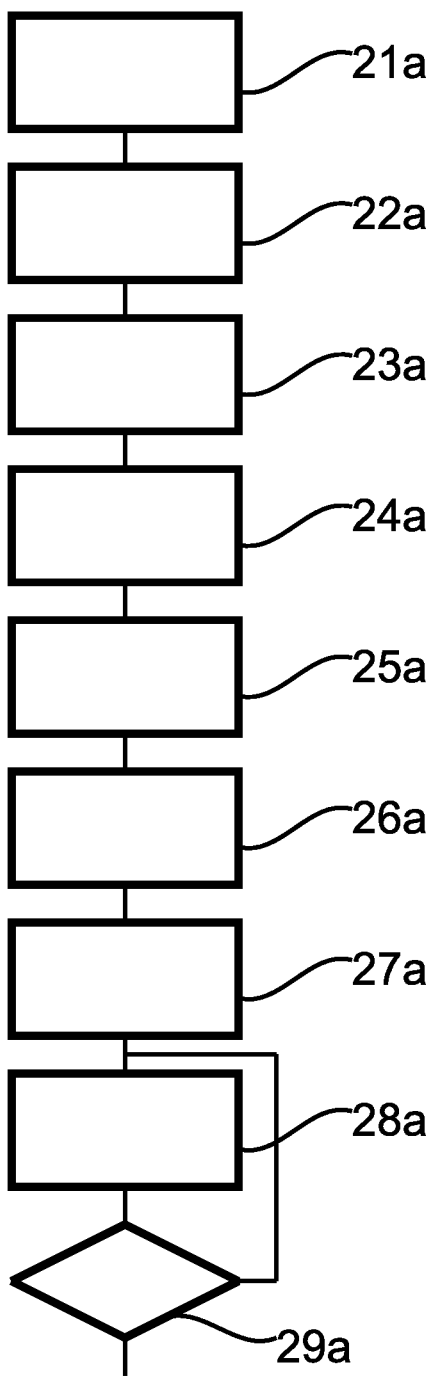
FIG. 2a,b show flow charts of joint computation of a correlation

FIG. 2a,b show flow charts of steps executed by first and second processor 10a,b in the joint computation of a correlation, i.e. of a sum of products of values from the databases in first and second storage device 14a,b. FIG. 3 shows communication between first and second processor 10a,b during the joint computation of the correlation.

FIG. 2a shows a flow chart of steps executed by first processor 10a. In a first step 21a first processor 10a retrieves data values from first storage unit 14a. First processor 10a retrieves data values in first elements of a first set from first storage unit 14a. The elements from the set may be records in a set of such records in first storage unit 14a. In this case, the data values may be values in a first and second fields of a record in the set of records in first storage unit 14a. Optionally first processor 10a computes further data values from stored data values. The set of records may comprise all records from a table of a database in first storage unit 14a. In an embodiment, first step 21a may be preceded by a step (not shown) wherein the set of records is selected by execution of a query that can be evaluated based exclusively on information present in first storage unit 14a. For example, a selection filter may be applied in first processor 10a, to select the set from a larger set of data in the first storage unit 14a, based on the selection filter. Similarly the query based on information present in first storage unit 14a may be used to generate data values xi, vi: the data values may simply be stored data values from first storage unit 14a, or functions of such stored values or of combinations of stored values.

FIG. 3 shows the communication involved between first processor 10a and first storage unit 14a including the transmission 30 of the data values in first and second fields of the set of records.

In a second step 22a, first processor 10a computes coefficients C(n) of a polynomial P(x), further called the detection polynomial, that has roots at the data values in the first fields of the set of records, i.e. where P(x)=0 for x values of data in the first field in the set of records, or further data computed from data in fields in the set of records. Such a polynomial is a product of factors (x−xi) for the different values xi in the first field of the records from the set of records. No encryption or secure computing is needed for this. The coefficients C(n) can be computed from this, e.g. recursively from $C^{(i)}(n)=C^{(i-1)}(n-1)-xi*C^{(i-1)}(n)$, wherein $C^{(i)}(n)$ is the coefficient for the power n (n greater than or equal to zero) of x in the polynomial P(x) computes with values xj with j smaller than or equal to i. The coefficients C(n) are obtained by including N values xi in this way, where N is the number of records in the set of records. The computations in second step 22a and the other steps may be performed according to the arithmetic of an instance of a finite field, e.g. using arithmetic computed modulo a suitable number.

In a third step 23a, first processor 10a encrypts the coefficients C(n) of the detection polynomial P(x) using an additive-homomorphic encryption scheme, i.e. by computing E(C(n)) for each n, using an encryption function that has the property E(x+y)=E(x)*E(y) for any values x and y. Second and third step 22a, 23a are also part of prior art oblivious polynomial evaluation. Any suitable form of encryption may be used. For example, each coefficient value may be encrypted as a whole, or bits of the coefficient value may be encrypted separately. Instead of an additive homomorphic encryption scheme e.g. secret-sharing may be used.

In a fourth step 24a, first processor 10a computes coefficients I(n) of a polynomial Q(x) that has values equal to the data values in the second fields of the set of records, or further values computed from such fields, when the value of the argument x of the polynomial Q(x) equals the value in the first field of the same record. That is, Q(xi)=vi for values xi and vi of data in the first and second field in the same record, or further values computed from such fields. Q will be called an interpolation polynomial.

Methods of computing interpolation polynomials are known per se. For given xi and vi many interpolation polynomials exist with the required priority, and any such interpolation polynomial may be used. A simple example of an interpolation polynomial that depends linearly on the values vi can be written Q(x)=sum over i of vi*Pi(x)/Pi(xi), wherein Pi(x) is a product of factors (x−xj) for the values xj of the first field of all records in the set except for the record where the value in the first field is xi (therefore P(x)=(x−xi)*Pi(x)). Preferably, numbers from a finite field are used (e.g. with addition and multiplication modulo some number K), so that the division by Pi(xi) corresponds to a multiplication by the reciprocal of Pi(xi) in this field. Otherwise, if approximate computations suffice, rounded numbers may be used to generate an approximate interpolation polynomial for which Q(xi) approximates vi.

When the interpolation polynomial is used that is a sum of vi*Pi(x)/Pi(xi), the coefficients I(n) of the polynomial Q(x) can be computed by computing the coefficients I(n;i) of each Pi(x) and I(n)=vi*I(n;i)/Pi(xi). The coefficients I(n;i) can be computed in the same way as the coefficients of P(x), as in third step 23a, or from the coefficients C(m) of P(x).

In a fifth step 25a, first processor 10a encrypts the coefficients I(n) of the interpolation polynomial Q using the same additive-homomorphic encryption scheme. As for the detection polynomial P any suitable form of encryption or secret sharing may be used. For example, each coefficient value may be encrypted as a whole, or bits of the coefficient value may be encrypted separately.

In a sixth step 26a, first processor 10a transmits the encrypted coefficients C(n) and I(n) of the detection polynomial P and the interpolation polynomial Q to second processor 10b via communication network 12. FIG. 3 shows the communication for transmitting coefficients C(n) and I(n) from first processor 10a to second processor 10b as transmissions 31, 32. Any form of transmission may be used. In practice a series of transmissions of successive subsets or bits of the coefficients may be used, or encrypted coefficients C(n) and I(n) may be transmitted in the same message or messages.

In a seventh and eight step 27a, 28a first processor 10a executes a series of secure equality protocols and secure multiplications jointly with first processor 10b, until first processor 10a determines in a ninth step 29a that no further repetition of eight step 27a, 28a is needed. A secure equality protocol may be performed by executing a secure comparison protocol. An example of a secure comparison protocol is known per se e.g. from Lipmaa, H. and Toft, T. (2013), Secure equality and greater-than tests with sublinear online complexity, in 'Automata, Languages, and Programming—40th International Colloquium, ICALP 2013, Riga, Latvia, Jul. 8-12, 2013, Proceedings, Part II', pp. 645-656).

FIG. 3 shows the communication for the secure equality protocols and secure multiplications as transmissions 342 and 342. Seventh and eight step 27a, 28a will be described further in the context of FIG. 2b.

Figure 2B:
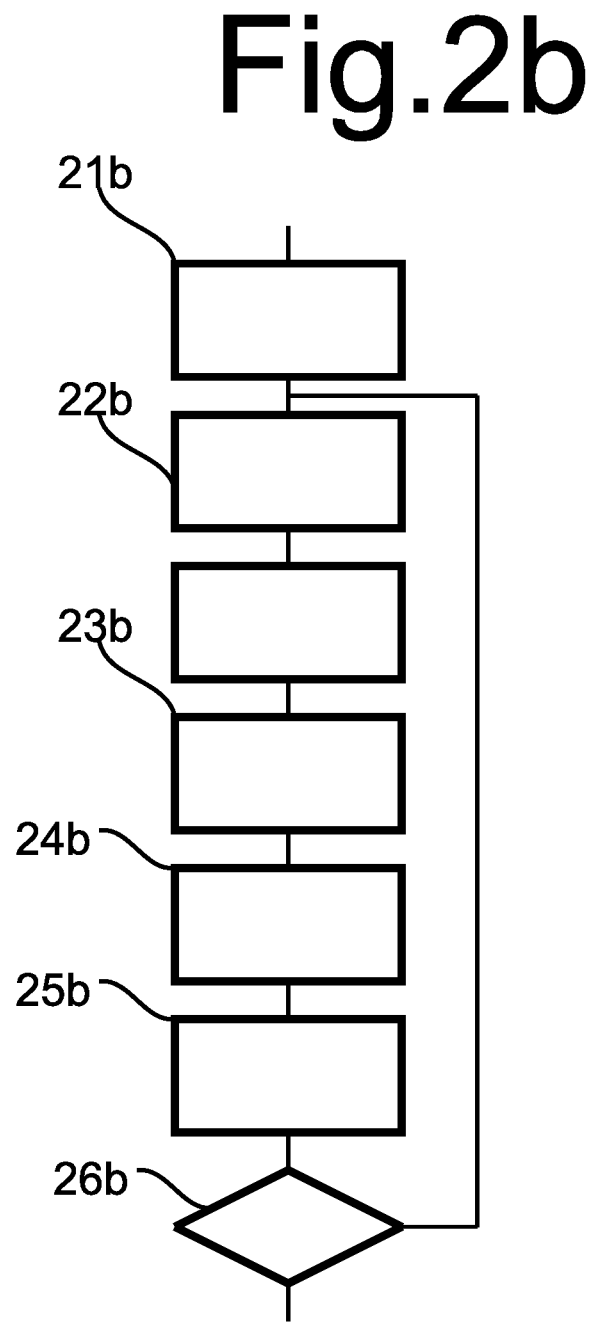

FIG. 2b shows a flow chart of steps executed by second processor 10b. In a first step 21b, second processor 10b receives the encrypted coefficients C(n) and I(n) of the detection polynomial P and the interpolation polynomial Q transmitted by first processor 10a in sixth step 26a.

In a second to fifth steps 22b-25b, second processor 10b repeatedly causes a series of communications indicated by block 34 in FIG. 3, successive executions of second to fifth steps 22b-25b using successive records from second storage unit 14b as a current record. In second step 22b retrieves values xi' and wi in first and second fields of the current record from second storage unit 14b. FIG. 3 shows the communication 340 involved between second processor 10b and second storage unit 14b including retrieval of the transmission 30 of the data values.

In third step 23b second processor 10b computes the value E(P(xi')) of the detection polynomial P for the retrieved value xi' of the first field of the current record from second storage unit 14b in the encrypted domain. Second processor 10b has the encrypted coefficients E(C(n)) and the plain value of the value xi' of the first field of the current record. When an additive homomorphic encryption scheme is used (e.g. when E(x+y)=E(x)*E(y) for arbitrary x and y), this enables second processor 10b to compute E(P(xi')) on its own, without requiring the ability to decrypt the encrypted coefficients E(C(n)).

The value P(xi') will be zero if xi' equals the value xj in the first field of any of the records in the set of records of first processor 10a. But this is not visible from E(P(xi')) in the encrypted domain. A secure equality protocol is executed jointly by first and processor 10a,b to obtain a result E(Di)

that signals an encrypted value Di of one or zero, when the value P(xi') equals zero and when the value P(xi') does not equal zero respectively.

Seventh step 27a of the flow chart of the process of first processor 10 of FIG. 2a and fourth step 24b of the flow-chart of the process of second processor 10b of FIG. 2b provide for the joint execution of the secure equality protocol. In FIG. 3 communication 342 represents the communication between second processor 10b and second storage unit involved with the secure equality protocol.

In fifth step 25b second processor 10b computes the encrypted value E(wi*Q(xi')*Di), wherein "i" refers to the current record and accumulates an encrypted sum E(S) of wi*Q(xi')*Di values for the records that have been processed so far in preceding repetitions of second to fifth step 22b-25. Herein wi*Q(xi')*Di is the product of wi, the value of the second field in the current record, Q(xi'), the value of the interpolation polynomial Q(x) with the value xi' of the first field in the current record as argument, and the value of Di of fourth step 24b, which signals an encrypted value Di of zero or one, when the value P(xi') for the value xi' of the second field of the current record equals zero or not.

A secure multiplication protocol executed jointly by first and second processor 10a,b is used to compute E(wi*Q(xi')*Di) using E(Q(xi')) and E(Di), which are both encrypted, and wi, to which second processor 10b may have access in unencrypted form.

Eight step 28a of the flow chart of the process of first processor 10 of FIG. 2a and fifth step 25b of the flow-chart of the process of second processor 10b of FIG. 2b provide for the joint execution of the secure multiplication protocol. In FIG. 3 communication 344 represents the communication between second processor 10b and second storage unit involved with the secure equality protocol. Second processor 10b has the encrypted coefficients E(I(n)) and the plain values of the value xi and vi of the first and second field of the current record. The accumulation of the encrypted sum E(S) and part of the computation of the product in fifth step 25b may be executed within second processor 10b when an additively homomorphic encryption is used (e.g. E(wi*Q(xi')) and/or E(wi*Di) and/or E(Q(xi')) may be computed within second processor 10b).

In sixth step 26b second processor 10b determines whether all records in the set of records from second storage unit 14b have been processed. If not, second processor 10b repeats the process from second step 22b. As in the case of first step 21a, second step 22b may be preceded by a step (not shown) wherein the set of records from second storage unit 14b is selected by execution of a query that can be evaluated based exclusively on information present in second storage unit 14b. For example, a selection filter may be applied in second processor 10b, to select the set from a larger set of data in the second storage unit 14b, based on the selection filter. Similarly the query based on information present in second storage unit 14b may be used to generate data values xi' and wi: the data values may simply be stored data values from second storage unit 14b, or functions of such stored values or of combinations of stored values.

When all records in the set of records from second storage unit 14b have been processed, second processor 10b has computed an encrypted sum E(S) of products of values vi and wi in the second fields of records in sets of records in first and second storage unit 14a,b that have the same value xi=xi' in the first field. In a further step (not shown), second processor 10b may transmit the encrypted sum E(S) to a device that is able to decrypt the encrypted sum E(S) (e.g. using a decryption key).

In the computation of E(S), it is avoided that values from fields of second storage unit 14a,b need to be transmitted via the network 12 between the first and second processor 10a,b. Even the values vi, wi of which the sum of products is computed need not be transmitted. It is avoided both that second processor 10b has to access to the individual values in the first storage unit 14a, and that first processor 10a has to access to the individual values in the second storage unit 14b. The amount of communication over network 12 is scales in proportional to a (weighted) sum of the numbers of records in the sets of records from both storage units 14a,b. If there are N records in first storage unit 14a two times N coefficients need to be transmitted. If there are M records in second storage unit 14b transmissions of M secure equality and multiplication protocols need to be executed. In principle, the roles of the first and processors can be exchanged. A selection may be made which processor will perform the steps of first processor 10a, and which processor will perform the steps of second processor 10b, dependent on the values of N and M. This may be used to minimize transmissions.

In an embodiment, the system may comprise sensors that store data including sensor values and time and/or position coordinates at or for which the sensor data were sampled in the first and second storage unit 14a,b respectively. The sensor values could be pixel values for example. In such embodiments, the time and/or position coordinates may be used as the values in the first field and the sensor values may be used as values in the second fields. In other examples, the values from the first fields may be identifiers of objects, such as persons and the values in the second fields and the values from the second fields may values associated with the objects. In both cases, access to the information is limited and the amount of communication is kept small.

Although the embodiment has been described in database terms, using records and fields in such records, it should be appreciated that the process need not be limited to this context. Any set that defines value pairs (xi, vi) or (xi', wi) may be used. The values vi, wi may be any functions of xi, xi' or of one or more other values associated with xi, xi'. All that is needed is that the function values are used to compute the interpolation polynomial, however the values are obtained. Although the embodiment has been described for a sum of products that is symmetric in terms of the numbers available in the two processors, it should be appreciated that the factors from both sides may be different. For example, any moments may be computed, i.e. sums of products of powers $vi^{p1}$, $wi^{p2}$ of the values vi from the two sides, wherein the powers p1, p2 are different. The first processor may use its factor in the product to compute the interpolation polynomial and the second processor may compute its factor directly.

In another embodiment a similar computation may be used to generate records (d,V,W) of an intersection between the first data base table and the second database table, or at least one such record of the intersection. By including the encrypted value of d in such a table it is made possible to compute any function later. Thus it is determined later that a specific function is needed, such as the sum of the products V, W, or another function, the required function can be computed without computing di again.

In this embodiment a method is provided to use a distributed computing system that comprises a first device and a second device coupled by a communication network, to generate a record of an intersection between a first data base table and a second database table. Herein each record "i" from the first data base table contains a number Xi and an associated first value Vi. Each record "j" from the second data base table contains a number Xj' and an associated second value Wj. In the method, the numbers Xi from the first set and its associated first value Vi are accessed or computed by the first device and the numbers Xj' from the second set and its associated second values Wj are accessed or computed by the second device. In this embodiment, the method comprises the first device computing encrypted coefficients of a first polynomial P and a second polynomial Q from the numbers Xi from the first set and their associated first values Vi, the first polynomial having all numbers Xi from the first set as roots, the second polynomial Q values Q(Xi)=Vi for the numbers Xi from the first set;

the first device transmitting the encrypted coefficients of the first and second polynomial P, Q to the second device via the communication network;

the second device computing encrypted values <P(Xi')> and <Q(Xj')> of the first and second polynomial P, Q for a number Xj' in the second set from the encrypted coefficients;

the second device using a secure multiparty equality protocol to compute an encrypted binary value <di> from the encrypted value p(Xj') of the first polynomial p, having a first and second binary value when the value p(Xi') of the first polynomial p is zero and not zero respectively; and generating said record of the intersection by including the encrypted binary value <di> in combination with the first value Q(Xi') and second value Wj in said record of the intersection.

In this embodiment, records of the intersection table may be computed each for a respective different combination of records from the first and second tables. Thus if the first table contains N records and the second table contains M records, the intersection table may contain N*M records, each containing a value of d for the combination of records from the first and second tables that is used to form the record of the intersection table. If it is possible to decrypt di, the number of records can be reduced.

Similarly, a distributed computing system may be provided for securely computing a generate records (d,V,W) of an intersection between the first data base table and the second database table, or at least one such record of the intersection. The distributed computing system may comprise a storage device for storing the intersection table, with records computed for this intersection table.

Although the illustrated embodiment uses a test for equality xi=xi' of the values xi, xi' from the first fields, it should be realized that a test for other relations may be used. For example if the values from the first fields represent time or a position coordinate xi, xi', a test xi=xi'+d for a specified offset between the values, or more generally a function test xi=f(xi') may be used. For this purpose, second processor 10b may evaluate p(f(xi')) and q(f(xi')) and/or first processor 10a may use polynomials adapted to such functions.

Similarly, if the test for equality xi=xi' of the values xi has to be replaced by a test for approximate equality, such as that xi=xi'−1, xi' or xi'+1. This may be implemented effectively by enlarging one of the sets, e.g. the first set, so that in addition to each elements (xi, vi) the first set also contains elements (xi−1, vi) and (xi+1, vi) or so that so that in addition to each elements (xi', wi) the second set also contains elements (xi'−1, wi) and (xi'+1, wi). In the method, this may be implemented by performing steps of FIG. 2b that involve xi' also for x'−1 and xi'+1, with same value wi. Alternatively coefficients for the first and second polynomial may be generated and transmitted wherein the first polynomial p has xi−1, xi and xi+1 as roots and the second polynomial that has vi as values for xi−1, xi and xi+1.

Preferably, sets are used wherein the xi values are unique (the same value not occurring more than ones), or at least that values of vi for the same xi value are the same within a set. Instead of using the same encryption scheme for the coefficients of both the detection polynomial and the interpolation polynomial, different encryption scheme may be used. But in that case, transcryption or more complicated secure equality and/or secure multiplication may be needed.

In an embodiment, a similar process may be used to compute (sums of) products of functions of data values from more than two processors. This can be achieved by computing coefficients of detection polynomials and interpolation polynomials in all but one of the processors from local data and sending the coefficients to the remaining processors and evaluating encrypted values of these polynomials in said remaining processor.

Although examples have been described in terms of computing a sum of products, it should be appreciated that, instead of a product, another function f(v,w) of values v and w may be used that can be computed securely from encrypted values. For example f may be the edit distance (the number of bit differences) between v and w, for which a secure computation protocol is available. If a function f can be computed securely, so that it can be used in this way, so can other functions such as f(v,w)*v*w etc. Similarly, the computation need not be limited to a sum of products or function values. Individual product or other function values may be computed an stored for later use, the computation of the sum being omitted, or replaced by another way of combining products or other function values First and second processor 10a, b may be conventional programmable computers programmed with a program of instructions configured to make the processors perform the described processes. Optionally, first and second processor 10a, b may comprise co-processors for performing predetermined crypto computations, such as encryption of joint secure equality/multiplication protocols. Alternatively, first and second processor 10a, b may be specialized crypto processors.

The method may be applied to use of a distributed computation system to compute correlation between data stored in distinct database servers without transmitting the data in a form that allows reconstruction of the data outside the server where the data comes from.

The invention claimed is:

1. A method of using a distributed computing system that comprises a first device and a second device coupled by a communication network, to securely compute a function of a first value Vi and a second value Wi, associated with a discrete number in an intersection of a first and second set of discrete numbers Xi, Xi', or a record of an intersection table that contains Vi and Wi, wherein the numbers Xi from the first set and its associated first value Vi are accessed or computed by the first device and the numbers Xi' from the second set and its associated second values Wi are accessed or computed by the second device, the method comprising the first device computing encrypted coefficients of a first polynomial P and a second polynomial Q from the numbers Xi from the first set and their associated first values Vi, the first polynomial having all numbers Xi from the first set as roots, the second polynomial Q values Q(Xi)=Vi for the numbers Xi from the first set;

the first device transmitting the encrypted coefficients of the first and second polynomial P, Q to the second device via the communication network;

the second device computing encrypted values <P(Xi')> and <Q(Xi')> of the first and second polynomial P, Q for a number Xi' in the second set from the encrypted coefficients;

the second device using a secure multiparty equality protocol to compute an encrypted binary value <di> from the encrypted value <p(Xi')> of the first polynomial p, having a first and second binary value when the value p(Xi') of the first polynomial p is zero and not zero respectively;

the second device using a secure multiparty multiplication protocol or secure function value computation protocol to compute an encrypted value of a product <di Q(Xi') Wi > or function value <di f(Q(Xi'), Wi)>, or record (di, Q(Xi'), Wi) of the intersection table, from the encrypted binary value <di> computed for the number Xi' from the second set, the encrypted value <Q(Xi')> of the second polynomial Q computed for the number Xi' from the second set and the second value Wi associated with the number Xi' of the second set.

2. The method according to claim 1, comprising computing an encrypted sum of the products or function values from the encrypted product <di Q(Xi') Wi > or function value <<di f(Q(Xi'), Wi) > computed for all of the numbers Xi' and associated values Wi from the second set.

3. The method according to claim 1, wherein the encrypted product <di Q(Xi') Wi> is computed.

4. The method according to claim 1, comprising providing selection filters to the first and/or second device, and selecting the first and/or second set from a larger set in the first and/or second device based on the selection filters.

5. The method according to claim 1, wherein the first device retrieves the numbers Xi and associated values Vi from a first data base wherein the numbers Xi and associated first values Vi are stored in association with each other, such as in data base records of each number Xi containing the associated value Vi, the first device computing the encrypted coefficients of the first and second polynomial P from the retrieved numbers Xi and first values Vi.

6. The method according to claim 1, wherein the second device retrieves the numbers Xi' and associated second values Wi from a second data base wherein the numbers Xi' and associated values Wi are stored in association with each other, such as in data base records of each number Xi' containing the associated value Wi, the second device using the retrieved numbers Xi in said computing of encrypted values <P(Xi')> and <Q(Xi')> of the first and second polynomial P, Q, the second device using the retrieved second values in the computation of the encrypted value of the sum of products <di Q(Xi') Wi>.

7. The method according to claim 1, wherein the second device executes the secure multiparty equality protocol and the secure multiparty multiplication protocol jointly with the first device using communication via the communication network.

8. The method according to claim 1, wherein the second device computes an encrypted product <Q(Xi') Wi> of the encrypted value <Q(Xi')> of the second polynomial Q computed for the number Xi', the second device using the secure multiparty multiplication protocol to compute product of the encrypted binary value <di> and the encrypted product <Q(Xi') Wi>.

9. A method of operating a first device in a distributed computing system that comprises the first device and a second device coupled by a communication network, to securely compute a product or function of a first value Vi and a second value Wi, associated with discrete numbers in an intersection of a first and second set of discrete numbers Xi, Xi', wherein the number Xi from the first set and its associated first value Vi are accessed or computed by the first device and the number Xi' from the second set and its associated second value Wi are accessed or computed by the second device, the method comprising the first device computing encrypted coefficients of a first polynomial P and a second polynomial Q from the numbers Xi from the first set and their associated first values Vi, the first polynomial having all numbers Xi from the first set as roots, the second polynomial Q values Q(Xi)=Vi for the numbers Xi from the first set;

the first device transmitting the encrypted coefficients of the first and second polynomial P, Q to the second device via the communication network;

the first device executing a secure multiparty equality protocol jointly with the second device to compute encrypted binary values <di> from the encrypted values <p(Xi')> of the first polynomial p, having a first and second binary value when the value p(Xi') of the first polynomial p is zero and not zero respectively;

the first device executing a secure multiparty multiplication protocol jointly with the second device to compute an encrypted value of a product <di Q(Xi') Wi> or function value <<di f(Q(Xi'), Wi)> from the encrypted binary value <di> computed for the number Xi' from the second set, an encrypted value <Q(Xi')> of the second polynomial Q computed for the number Xi' from the second set and the second value Wi associated with the numbers Xi' of the second set.

10. A method of operating a second device in a distributed computing system that comprises a first device and the second device coupled by a communication network, to securely compute a product or function of a first value Vi and second value Wi, associated with discrete numbers in an intersection of a first and second set of discrete numbers Xi, Xi', wherein the number Xi from the first set and its associated first value Vi are accessed or computed by the first device and the number Xi' from the second set and its associated second values Wi are accessed or computed by the second device, the method comprising the second device receiving encrypted coefficients of the first and second polynomial P, Q from the first device via the communication network;

the second device computing encrypted values <P(Xi')> and <Q(Xi')> of the first and second polynomial P, Q for each of the numbers Xi' in the second set from the encrypted coefficients;

the second device using a secure multiparty equality protocol to compute encrypted binary values <di> from the encrypted values <p(Xi')> of the first polynomial p, having a first and second binary value when the value p(Xi') of the first polynomial p is zero and not zero respectively;

the second device using a secure multiparty multiplication protocol to compute an encrypted value of the product <di Q(Xi') Wi> or function value <<di f(Q(Xi'), Wi)> from the encrypted binary value <di> computed for the number Xi' from the second set, the encrypted value <Q(Xi')> of the second polynomial Q computed for the number Xi' from the second set and the second value Wi associated with the number Xi' from the second set.

11. A distributed computing system for securely computing a product of a first value Vi and a second value Wi, or a function value of the first value Vi and the second value Wi, associated with discrete numbers in an intersection of a first and second set of discrete numbers Xi, Xi', the system comprising a first device having access to the numbers Xi from the first set and their associated first values Vi, a second device coupled to the first device by a communication network, second device having access to the numbers Xi' from the second set and their associated second values Wi;

the first device including a first processor that is programmed to compute encrypted coefficients of a first polynomial P and a second polynomial Q from the numbers Xi from the first set and their associated first values Vi, the first polynomial having all numbers Xi from the first set as roots, the second polynomial Q values Q(Xi)=Vi for the numbers Xi from the first set;

transmit the encrypted coefficients of the first and second polynomial P, Q to the second device via the communication network;

the second device including a second processor that is programmed to compute encrypted values <P(Xi')> and <Q(Xi')> of the first and second polynomial P, Q for a number Xi' in the second set from the encrypted coefficients;

use a secure multiparty equality protocol to compute encrypted binary values <di> from the encrypted values <p(Xi')> of the first polynomial p, having a first and second binary value when the value p(Xi') of the first polynomial p is zero and not zero respectively;

use a secure multiparty multiplication protocol to compute an encrypted value of a product <di Q(Xi') Wi> or function value <<di f(Q(Xi'), Wi)> from the encrypted binary value <di> computed for the number Xi' from the second set, the encrypted value <Q(Xi')> of the second polynomial Q computed for the number Xi' from the second set and the second value Wi associated with the numbers Xi' of the second set.

12. The distributed computing system according to claim 11, wherein the second processor is programmed to compute an encrypted sum of the products from the encrypted product <di Q(Xi') Wi> computed for all of the numbers Xi' and associated values Wi from the second set.

13. The distributed computing system according to claim 12, wherein at least one of the first and second processors is programmed to receive a selection filter, and to select the first and/or second set from a larger set in the first and/or second device based on the selection filter.

14. The distributed computing system according to claim 13, comprising a first storage device and a second storage device coupled to the first and second device respectively, the first processor of the first device being programmed to retrieve the first numbers Xi from the first set and the associated first values Vi for use in said computation of the encrypted coefficients of the first polynomial P and the second polynomial Q from the first storage device, the second processor of the second device being programmed to retrieve the numbers Xi' of the second set and the associated second values Vi for use in the computation of the values of the polynomials and compute the encrypted value of the sum of products <di Q(Xi') Wi> from the second storage device.

* * * * *